(12) United States Patent
Swinney

(10) Patent No.: US 10,842,315 B1
(45) Date of Patent: Nov. 24, 2020

(54) ROTISSERIE OVEN WITH CUTTING BOARD

(71) Applicant: Linda L. Swinney, St. Petersburg, FL (US)

(72) Inventor: Linda L. Swinney, St. Petersburg, FL (US)

( * ) Notice: Subject to any disclaimer, the term of this patent is extended or adjusted under 35 U.S.C. 154(b) by 179 days.

(21) Appl. No.: 15/689,054

(22) Filed: Aug. 29, 2017

(51) Int. Cl.
  *A47J 37/04* (2006.01)
  *A47J 37/06* (2006.01)
  *A47J 37/07* (2006.01)

(52) U.S. Cl.
  CPC ............. *A47J 37/04* (2013.01); *A47J 37/041* (2013.01); *A47J 37/042* (2013.01); *A47J 37/0664* (2013.01); *A47J 37/07* (2013.01)

(58) Field of Classification Search
  CPC ......... A47J 37/041; A47J 37/042; A47J 37/04
  USPC .................. 99/419, 421 H, 421 HH
  See application file for complete search history.

(56) References Cited

U.S. PATENT DOCUMENTS

| | | | |
|---|---|---|---|
| 3,791,368 A | 2/1974 | Hunt | |
| D258,036 S | 1/1981 | Sabin | |
| 4,886,045 A | 12/1989 | Ducate, Jr. | |
| 4,934,333 A * | 6/1990 | Ducate, Jr. | A47J 37/0704 126/211 |
| 5,213,027 A | 5/1993 | Tsotsos | |
| 5,341,793 A | 8/1994 | Brown | |
| 5,421,318 A * | 6/1995 | Unruh | A47J 37/042 126/25 A |
| 5,778,766 A * | 7/1998 | Wang | A21B 7/005 219/400 |
| 6,425,318 B1 * | 7/2002 | Kim | A47J 37/0709 99/327 |
| 6,640,797 B1 | 11/2003 | Magers | |
| 6,742,445 B2 | 6/2004 | Backus | |
| 7,284,549 B1 | 10/2007 | Eby | |
| 2008/0006259 A1 | 1/2008 | Eby | |

FOREIGN PATENT DOCUMENTS

EP  1405589 A1  4/2004

* cited by examiner

*Primary Examiner* — Reginald Alexander
(74) *Attorney, Agent, or Firm* — Kyle A. Fletcher, Esq.

(57) ABSTRACT

The rotisserie oven assembly includes a housing that may contain a food item. A processor is coupled to the housing. A transceiver is coupled to the housing. The transceiver is operationally coupled to the processor. A motor is coupled to the housing. The motor is operationally coupled to the processor. A rotisserie is operationally coupled to the housing. The rotisserie is operationally coupled to the motor. The motor moves the rotisserie. A door is operationally coupled to the housing. The door closes the housing. A cutting board is coupled to the door. The door is positionable in a deployed position. The cutting board may have a food item positioned thereon. A heating element is coupled to the door. The heating element cooks the food item.

19 Claims, 5 Drawing Sheets

US 10,842,315 B1

ROTISSERIE OVEN WITH CUTTING BOARD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of rotisserie ovens, more specifically, rotisserie ovens with cutting boards.

SUMMARY OF THE INVENTION

An embodiment of the disclosure meets the needs presented above by generally comprising a housing that may contain a food item. A processor is coupled to the housing. A transceiver is coupled to the housing. The transceiver is operationally coupled to the processor. A motor is coupled to the housing. The motor is operationally coupled to the processor. A rotisserie is operationally coupled to the housing. The rotisserie is operationally coupled to the motor. The motor moves the rotisserie. A door is operationally coupled to the housing. The door closes the housing. A cutting board is coupled to the door. The door is positionable in a deployed thereon. A heating element is coupled to the door. The heating element cooks the food item.

An object of the invention is to provide a device that is rotisserie oven with cutting board.

These together with additional objects, features and advantages of the rotisserie oven with cutting board will be readily apparent to those of ordinary skill in the art upon reading the following detailed description of presently preferred, but nonetheless illustrative, embodiments of the rotisserie oven with cutting board when taken in conjunction with the accompanying drawings.

In this respect, before explaining the current embodiments of the rotisserie oven with cutting board in detail, it is to be understood that the rotisserie oven with cutting board is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rotisserie oven with cutting board.

It is therefore important that the claims be regarded as including such equivalent construction insofar as they do not depart from the spirit and scope of the rotisserie oven with cutting board. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
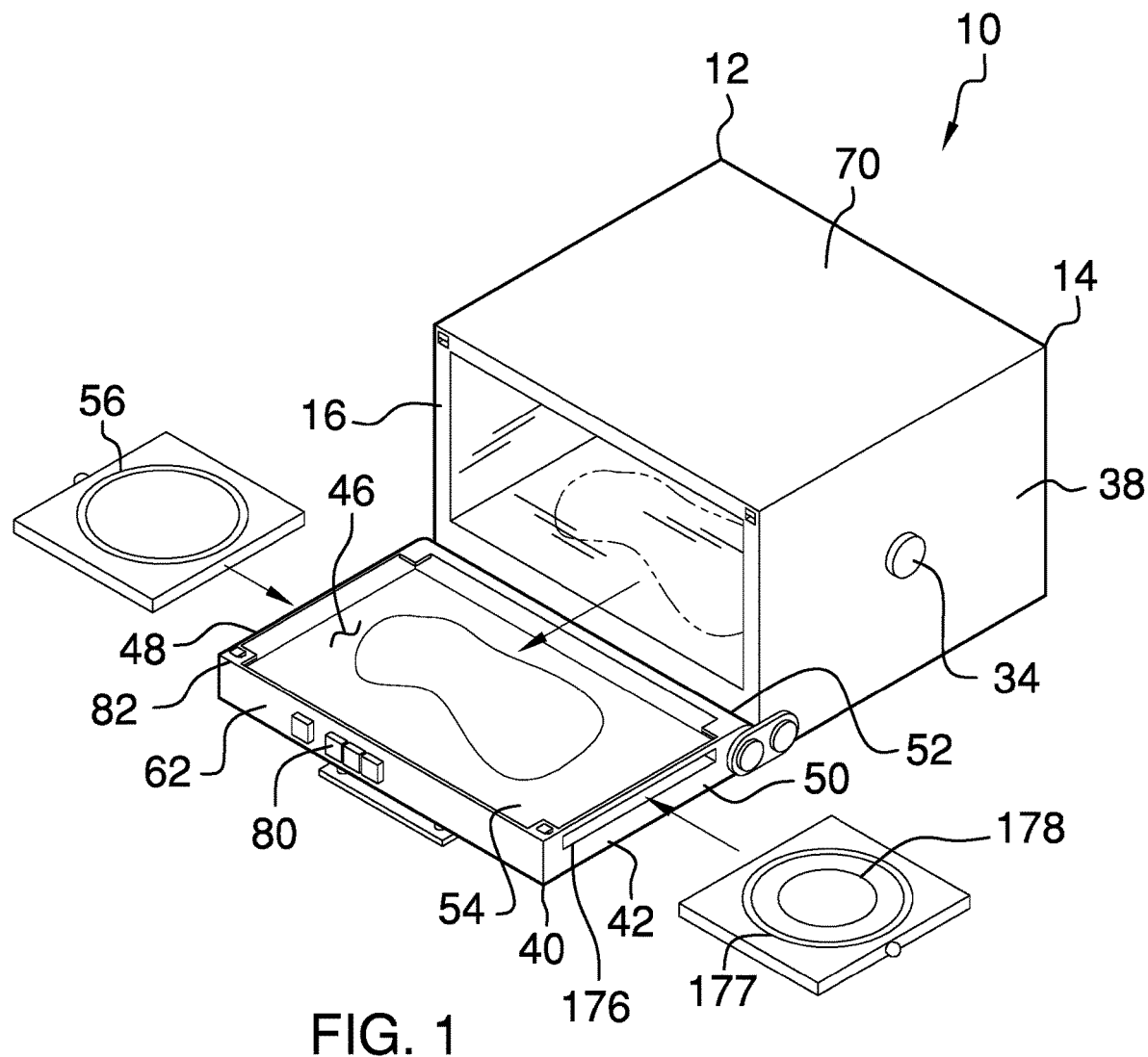
FIG. 1 is a perspective view of a rotisserie oven assembly according to an embodiment of the disclosure.
Figure 2:
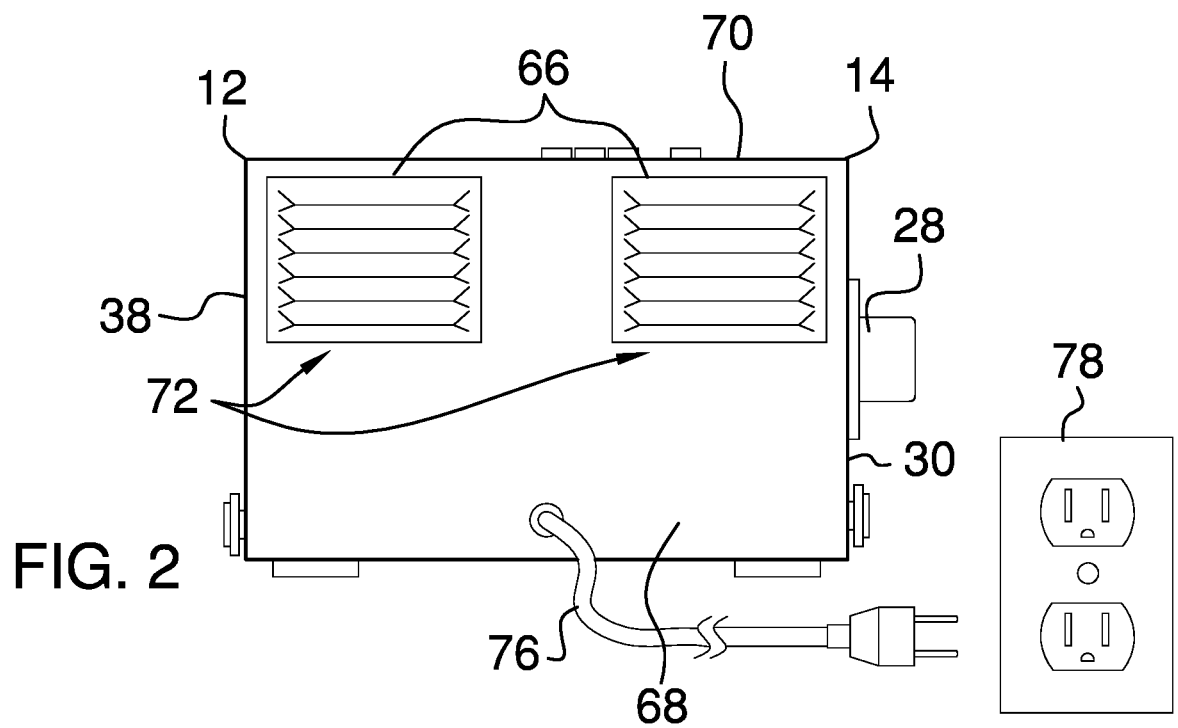
FIG. 2 is a back view of an embodiment of the disclosure.
Figure 3:
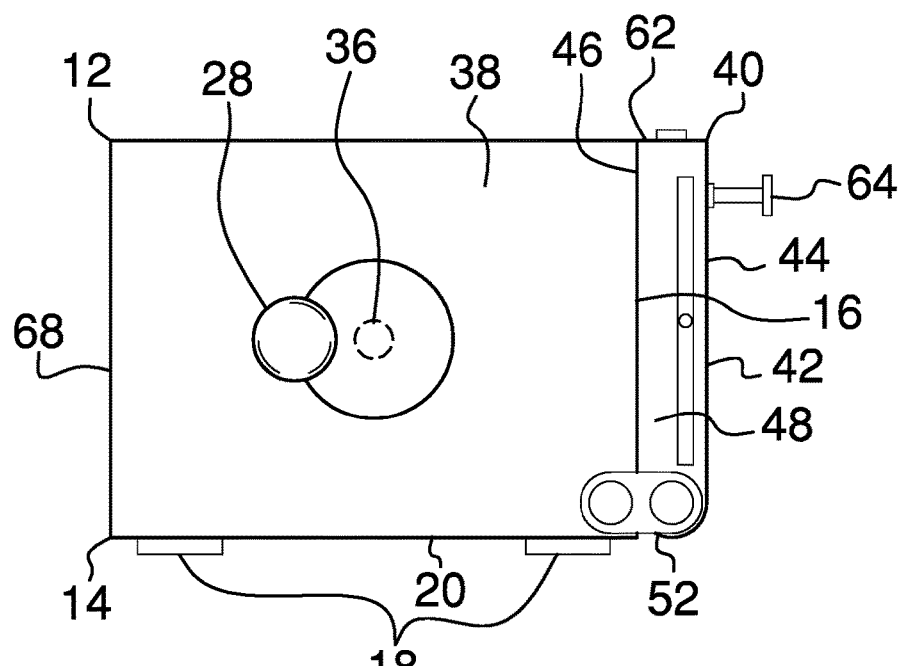
FIG. 3 is a right side view of an embodiment of the disclosure.
Figure 4:
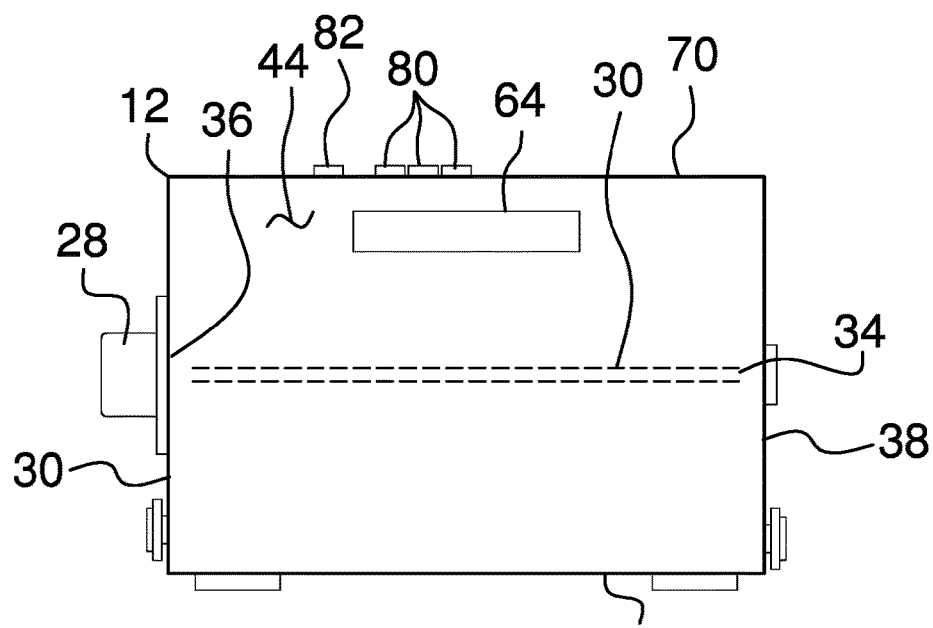
FIG. 4 is a front view of an embodiment of the disclosure.
Figure 5:
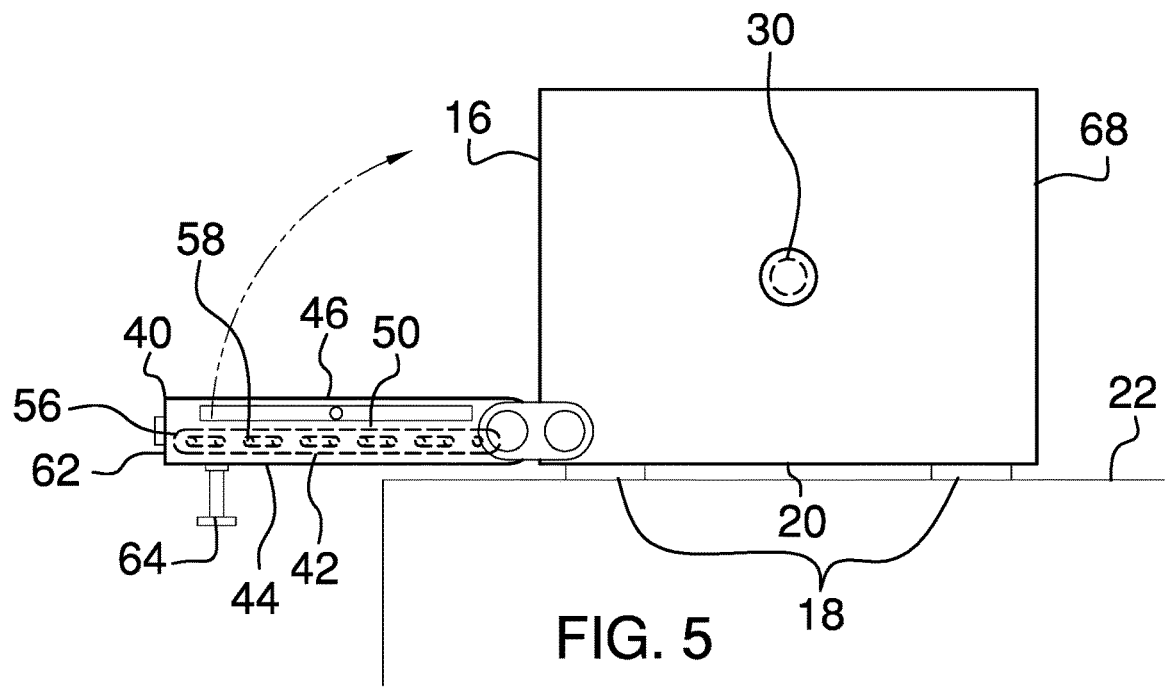
FIG. 5 is a left side view of an embodiment of the disclosure.
Figure 6:
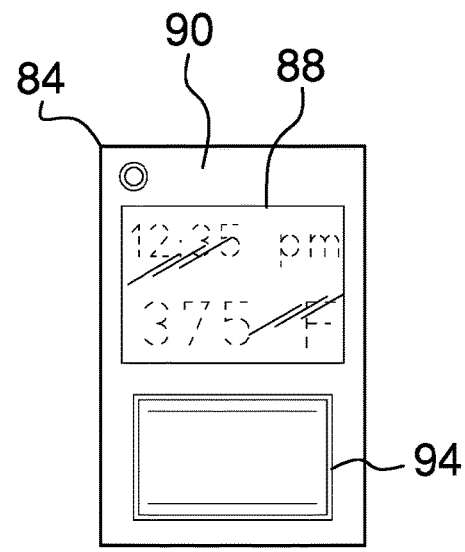
FIG. 6 is a front view of remote control of an embodiment of the disclosure.
Figure 7:
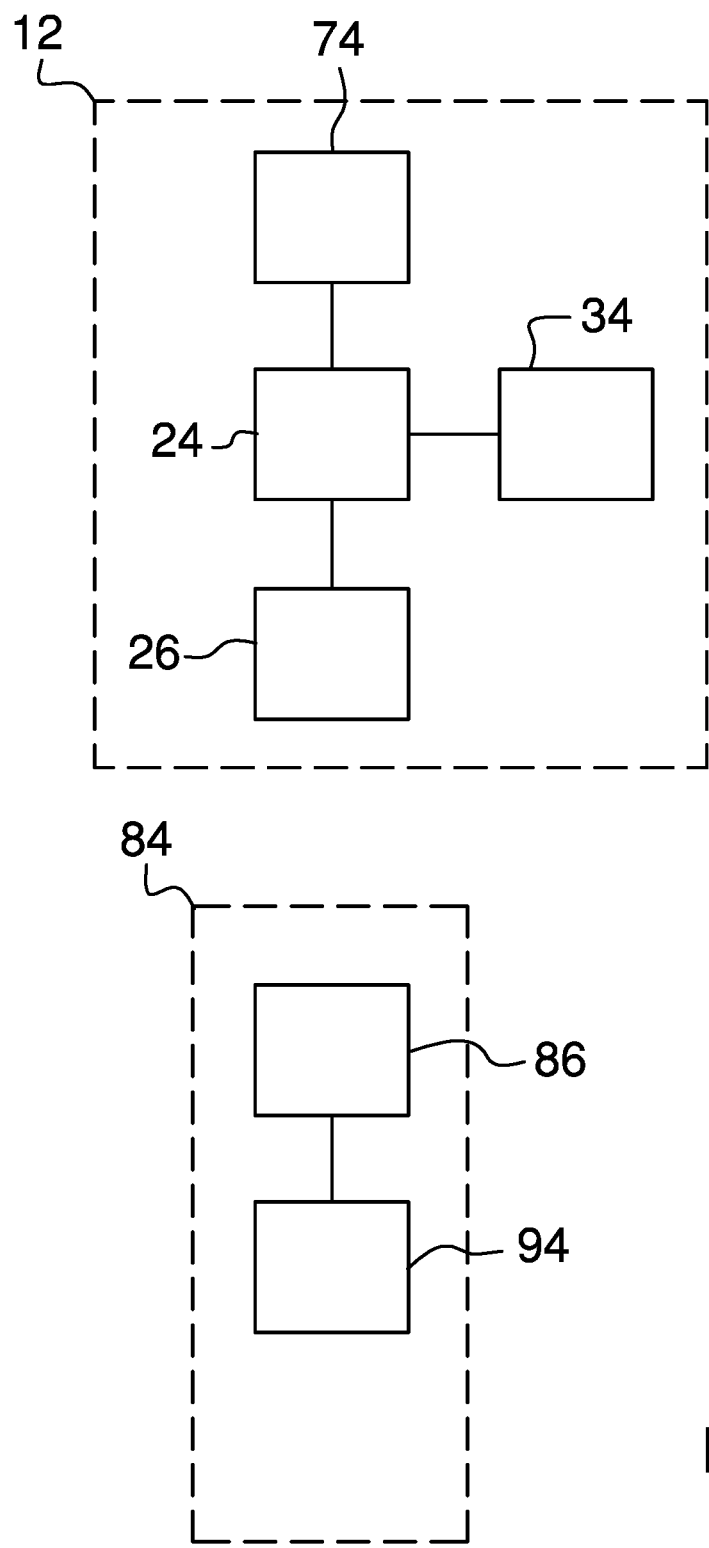
FIG. 7 is a schematic view of an embodiment of the disclosure.

As best illustrated in FIGS. 1 through 7, the rotisserie oven assembly 10 generally comprises a housing 12. An exterior wall 14 of the housing 12 has a length that is greater than a height of the exterior wall 14 of the housing 12. The housing 12 has a rectangular parallelepiped shape. A front side 16 of the exterior wall 14 of the housing 12 is open to access an interior of the housing 12. The housing 12 may contain a food item 100.

A plurality of feet 18 are coupled to a bottom side 20 of the exterior wall 14 of the housing 12. Each of the plurality of feet 18 are positioned proximate an associated one of four corners of the bottom side 20 of the exterior wall 14 of the housing 12. The plurality of feet 18 support the housing 12 above a support surface 22. The support surface 22 may be a table top.

A processor 24 is coupled to the housing 12. The processor 24 may be an electronic processor of any conventional design. A transceiver 26 is coupled to the housing 12. The transceiver 26 is electrically coupled to the processor 24. Finally, the transceiver 26 may be an RF transceiver of any conventional design.

A motor 28 is coupled to a first lateral side 30 of the exterior wall 14 of the housing 12. The motor 28 is electrically coupled to the processor 24. The motor 28 may be an electrical motor of any conventional design.

A rotisserie 32 has a first end 34 and a second end 36. The rotisserie 32 is elongated. Moreover, the rotisserie 32 is positioned within an interior of the housing 12. Each of the first 34 and second 36 ends of the rotisserie 32 are rotatably coupled to an associated one of the first lateral side 30 and a second lateral side 38 of the exterior wall 14 of the housing

12. The first end 34 of the rotisserie 32 is coupled to the motor 28 so the motor 28 rotates the rotisserie 32.

The food item 100 is positionable on the rotisserie 32. The rotisserie 32 rotates the foot item. Finally, the food item 100 may be any food item 100 to be cooked.

A door 40 is provided. The door 40 has an exterior edge extending between a front surface 44 and a back surface 46 of the door 40. Each of a first oblique side 48 and a second oblique side 50 of the exterior edge 42 of the door 40 is hingedly coupled to an associated one of the first 30 and second 38 lateral sides of the exterior wall 14 of the housing 12. A lower side 52 of the exterior edge 42 of the door 40 is positioned proximate the bottom side 20 of the exterior wall 14 of the housing 12. The door 40 closes the housing.

A cutting board 54 is coupled to the back surface 46 of the door 40. The cutting board 54 completely covers the back surface 46 of the door 40. Moreover, the door 40 is positionable in a deployed position. The cutting board 54 may be comprised of a translucent and heat conductive material.

The cutting board 54 is exposed when the door 40 is positioned in the deployed position. Additionally, the interior of the housing 12 is accessible when the door 40 is positioned in the deployed position. The cutting board 54 may have the food item 100 positioned thereon when the door 40 is in the deployed position. The food item 100 may be cut after the food item 100 is placed on the cutting board 54.

A heating element is coupled to the door 40. The heating element 56 is positioned between the front surface 44 of the door 40 and the cutting board 54. The heating element 56 comprises a plurality of coils 58 extending between each of the first 48 and second 50 oblique sides of the exterior edge 42 of the door 40. Additionally, the plurality of coils 58 extends between the bottom side 52 and a top side 62 of the exterior edge 42 of the door 40. The heating element 56 cooks the food item 100 when the food item 100 is placed within the housing 12.

A handle 64 is coupled to the front surface 44 of the door 40. The handle 64 is positioned proximate the top side 62 of the exterior edge 42 of the door 40. Moreover, the handle 64 may be gripped to open and close the door 40.

A plurality of vents 66 extends through a back side 68 of the exterior wall 14 of the housing 12. The plurality of vents 66 extends between a top side 70 of the exterior wall 14 of the housing 12 and middle of the back side 68 of the exterior wall 14 of the housing 12. Additionally, the plurality of vents 66 comprises a pair of sets of the plurality of vents 72. Each of the pair of sets of the plurality of vents 72 is positioned proximate an associated one of the first lateral side 30 and the second lateral side 38 of the exterior wall 14 of the housing 12. The plurality of vents 66 allows air to exit the interior of the housing 12.

A power supply 74 is coupled to the housing 12. The power supply 74 is electrically coupled to the processor 24. A power cord 76 is electrically coupled to the power supply 74. The power cord 76 extends outwardly from the back side 68 of the exterior wall 14 of the housing 12. The power cord 76 is selectively electrically coupled to a power source 78. The power source 78 may be an electrical outlet of any conventional design.

A plurality of actuators 80 is coupled to the top side 62 of the exterior edge 42 of the door 40. The plurality of actuators 80 is each electrically coupled to the processor 24. Moreover, the plurality of actuators 80 selective actuates the motor 28, the heating element 56, the processor 24 and the power supply 74. A heating element one of the plurality of actuators 82 actuates the heating element 56 between a minimum temperature and a maximum temperature.

A remote control 84 is provided. A remote transceiver 86 is coupled to the remote control 84. The remote transceiver 86 is in electromagnetic communication with the transceiver 26 in the housing 12. A display 88 is coupled to a front side 90 of the remote control 84. The display 88 displays indicia 92. The indicia 92 may comprise a time of day and an operational temperature of the heating element 56.

An actuator 94 is coupled to the front side 90 of the remote control 84. The actuator 94 is electrically coupled to the remote transceiver 86. The actuator 94 is selectively engaged in order to actuate the heating element 56, the motor 28 and the power supply 74 in the housing 12. The assembly 10 may be utilized with or without the remote control 84.

In use, the food item 100 is cooked on the rotisserie 32 in the housing 12. After the food item 100 has completed cooking, the door 40 is positioned in the deployed position. The food item 100 is positioned on the cutting board 54 so the food item 100 may be cooked. When the door 40 is positioned in the deployed position, the heating element 56 is actuatable to the minimum temperature. The heating element 56 keeps the food item 100 warm while the food item 100 is resting on the cutting board 54.

The door 40 is further defined with at least one slot 176. The at least one slot 176 is provided on the exterior edge 42 of the door 40. The at least one slot 176 provides a storage place for at least one removable plate 177. The at least one removable plate 177 is stored within the door 40 in order for the at least one removable plate 177 to be warmed via the invention 10. When heated, the at least one removable plate 177 is removed, and is used to keep an alternate food item 178 warm. The at least one removable plate 177 is able to absorb heat from the heating element 56 located within the door 40. The at least one removable plate 177 also includes a knob 180 to assist in removal and manipulation.

With respect to the above description, it is to be realized that the optimum dimensional relationship for the various components of the rotisserie oven assembly 7, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the rotisserie oven assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A rotisserie oven assembly having a heated cutting board coupled thereto, said assembly comprising:
 a housing configured to contain a food item;
 a processor coupled to said housing;
 a transceiver coupled to said housing, said transceiver being operationally coupled to said processor;
 a motor coupled to said housing, said motor being operationally coupled to said processor;
 a rotisserie operationally coupled to said housing, said rotisserie being operationally coupled to said motor wherein said motor moves said rotisserie;

a door operationally coupled to said housing such that said door closes said housing;

a cutting board coupled to said door, said door being positionable in a deployed position wherein said cutting board is configured to have the food item positioned thereon; and a heating element coupled to said door, said heating element cooking the food item.

2. The assembly according to claim 1, wherein an exterior wall of said housing having a length being greater than a height of said exterior wall of said housing wherein said housing has a rectangular parallelepiped shape.

3. The assembly according to claim 1, wherein a front side of an exterior wall of said housing being open to access an interior of said housing.

4. The assembly according to claim 3, wherein said motor being coupled to a first lateral side of said exterior wall of said housing.

5. The assembly according to claim 4, wherein said rotisserie having a first end and a second end, said rotisserie being elongated.

6. The assembly according to claim 1, wherein said rotisserie being positioned within an interior of said housing such that each of a first end and a second end of said rotisserie are rotatably coupled to an associated one of a first lateral side and a second lateral side of an exterior wall of said housing.

7. The assembly according to claim 1, wherein a first end of said rotisserie being coupled to said motor wherein said motor rotates said rotisserie.

8. The assembly according to claim 1, wherein said door having an exterior edge extending between a front surface and a back surface of said door.

9. The assembly according to claim 1, wherein each of a first oblique side and a second oblique side of an exterior edge of said door being hingedly coupled to an associated one of a first lateral side and a second lateral side of an exterior wall of said housing proximate a bottom side of said exterior wall of said housing.

10. The assembly according to claim 1, wherein said transceiver being electrically coupled to said processor.

11. The assembly according to claim 1, wherein said cutting board being coupled to a back surface of said door wherein said cutting board completely covers said back surface of said door.

12. The assembly according to claim 1, wherein said heating element being positioned between a front surface of said door and said cutting board.

13. The assembly according to claim 1, wherein said heating element being electrically coupled to said processor.

14. The assembly according to claim 1, wherein said heating element comprising a plurality of coils extending between each of a first oblique side and a second oblique side of an exterior edge of said door, said plurality of coils extending between a bottom side and a top side of said exterior edge of said door.

15. The assembly according to claim 1, wherein:

a power supply coupled to said housing;

said power supply being electrically coupled to said processor;

a power cord electrically coupled to said power supply such that said power cord extends outwardly from a back side of an exterior wall of said housing; and said power cord being electrically coupled to a power source.

16. The assembly according to claim 15, wherein:

said door is further defined with at least one slot;

wherein the at least one slot is provided on the exterior edge of the door;

wherein the at least one slot provides a storage place for at least one removable plate.

17. The assembly according to claim 16, wherein the at least one removable plate is stored within the door in order for the at least one removable plate to be warmed, and removed so as to keep an alternate food item warm.

18. The assembly according to claim 17, wherein the at least one removable plate is able to absorb heat from the heating element located within the door.

19. The assembly according to claim 18, wherein the at least one removable plate also includes a knob to assist in removal and manipulation.

* * * * *